(12) United States Patent
Yamamoto

(10) Patent No.: US 7,072,080 B1
(45) Date of Patent: Jul. 4, 2006

(54) INFORMATION PROCESSOR

(75) Inventor: Hiroyuki Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 926 days.

(21) Appl. No.: 09/654,271

(22) Filed: Sep. 1, 2000

(30) Foreign Application Priority Data

Sep. 2, 1999 (JP) .................................. 11-248267

(51) Int. Cl.
   H04N 1/00 (2006.01)
   H04N 1/32 (2006.01)

(52) U.S. Cl. ...................... 358/442; 358/468; 358/434; 358/441; 358/437; 358/406

(58) Field of Classification Search ................ 358/468, 358/1.15, 442, 1.14, 434, 441, 437, 406; 379/100.01–100.09
   See application file for complete search history.

(56) References Cited

U.S. PATENT DOCUMENTS

| | | | | |
|---|---|---|---|---|
| 5,828,462 A | * | 10/1998 | Hashimoto et al. | 358/296 |
| 5,920,727 A | * | 7/1999 | Kikinis et al. | 713/323 |
| 5,969,827 A | * | 10/1999 | Sugimoto et al. | 358/400 |
| 5,974,569 A | * | 10/1999 | Nickles | 714/38 |
| 6,075,570 A | * | 6/2000 | Usui et al. | 725/49 |
| 6,128,104 A | * | 10/2000 | Okabe et al. | 358/442 |
| 6,308,061 B1 | * | 10/2001 | Criss et al. | 455/418 |
| 6,426,771 B1 | * | 7/2002 | Kosugi | 348/222.1 |

FOREIGN PATENT DOCUMENTS

| | | |
|---|---|---|
| JP | 6-98074 | 4/1994 |
| JP | 6-237360 | 8/1994 |

OTHER PUBLICATIONS http://www.ricoh-usa.com/downloads/manuals/fax/fax2000I.pdf, pp. 7-10, 69-72, 167, 168.*

* cited by examiner

Primary Examiner—Douglas Q. Tran
Assistant Examiner—Chan S. Park
(74) Attorney, Agent, or Firm—Oliff & Berridge, PLC

(57) ABSTRACT

An information processor includes a CPU that calculates various kinds of data, a clock circuit that measures time independently of the CPU, an operational condition switching circuit that makes the CPU switch between sleep and active conditions according to predetermined conditions, and a clock adjustment function that is executed by the CPU, so as to output time by adjusting the time measured by the clock circuit, at a predetermined time. The information processor also includes a condition inputting circuit that inputs a recovery condition, to switch the CPU from the sleep condition to the active condition, when the time measured by the clock circuit comes to a clock adjustment time when the clock adjustment function is executed by the CPU, or a predetermined time before the clock adjustment time. The adjustment function can be properly operated when a sleep function for a control system is used in combination with the adjustment function that operates independently of the control system. The information processor may be provided to, for example, a facsimile apparatus or a telephone.

29 Claims, 6 Drawing Sheets

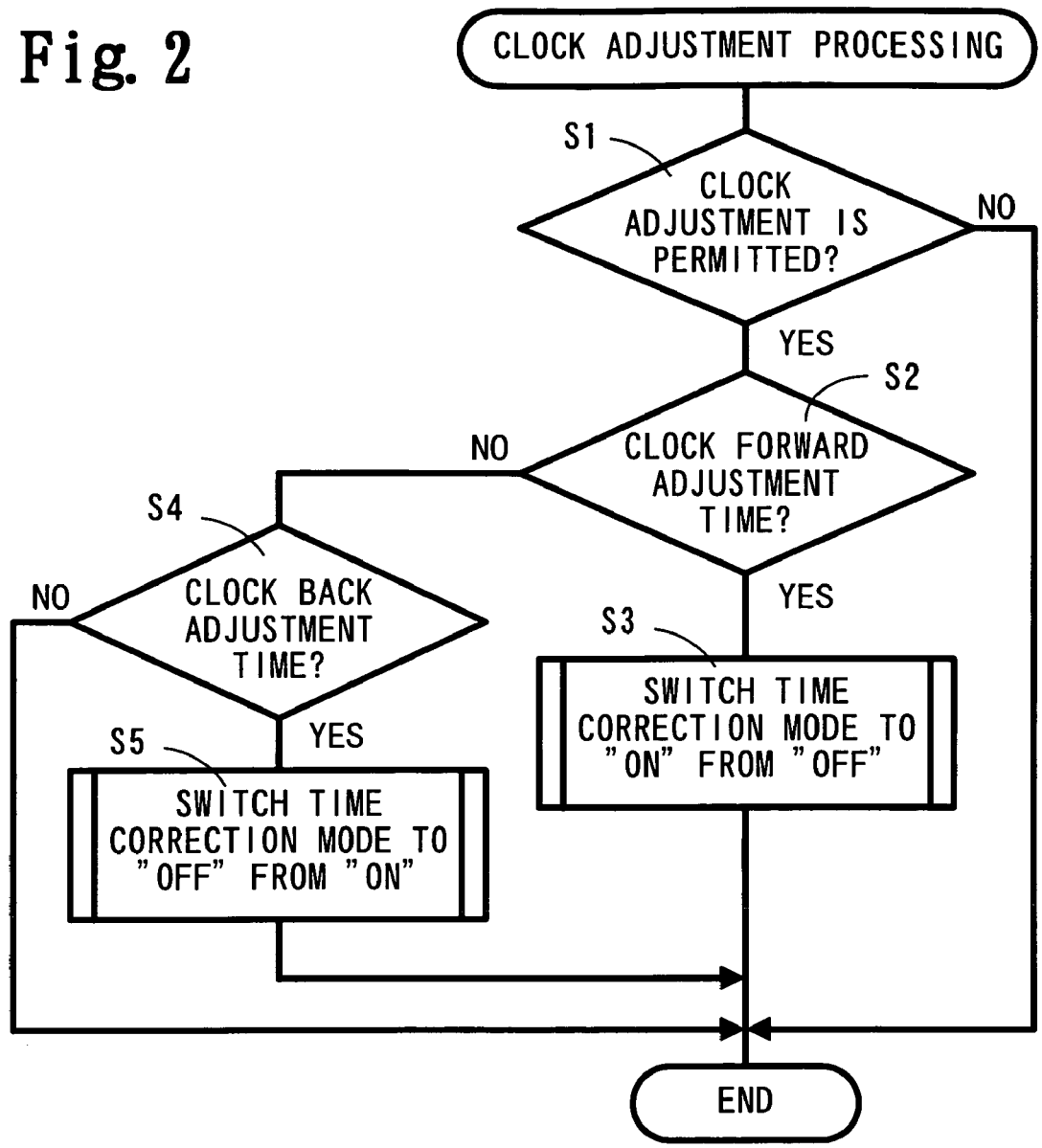

INFORMATION PROCESSOR

BACKGROUND OF THE INVENTION

1. Field of Invention

The invention relates to an information processor, which is included in, for example, a facsimile apparatus or a phone, that has a power saving sleep function for a control system, and a clock adjustment function for turning a clock forward or back, to adjust for, for example, daylight-saving time.

2. Description of Related Art

A facsimile apparatus transmits to, and receives from another facsimile apparatus, data such as character data and image data of, for example, a photograph. Currently, a facsimile apparatus having a power saving sleep function for a control system is being developed as the facsimile apparatus is not always performing particular jobs, but is idle most of the time. The sleep function allows a central processing unit (CPU) that controls operations of the facsimile apparatus to go into a sleep condition from an active condition. The sleep function automatically begins after a certain period of idleness in which no operation or signal input/output is performed.

In addition to the above-described sleep function, the facsimile apparatus also includes a clock adjustment function. The clock adjustment function is used, for example, at the beginning and end of daylight-saving time to set the clock ahead and back, respectively, by one hour. More specifically, with the clock adjustment function, a built-in clock of the facsimile apparatus is automatically advanced one hour at the beginning of day-light saving time. The time adjusted by advancing the clock is output so that the adjusted time is indicated on a display panel. The clock adjustment function is performed by the CPU.

However, the facsimile apparatus having the above-described sleep function and clock adjustment function sometimes ends in a failure of the clock adjustment function due to the sleep function. If the timing of the clock adjustment occurs at a time when the CPU is inactive, the clock cannot be adjusted due to the CPU being inactive. This problem is likely to occur since the clock adjustment timing occurs late at night when the CPU may be placed in the sleep condition. A user may misunderstand, based on the assumption that the clock adjustment function was properly performed, that the time indicated on the display panel was adjusted to daylight-saving time.

In addition, other processing, which is performed using the built-in clock, may not be properly carried out because of the unperformed clock adjustment function. For example, in the facsimile communication, an incorrect time may be used for the processing to add the facsimile transmission time to the data of an original document, to record the time of the communication or telephone call on a management report, or to send a facsimile at a preset time using a timer.

SUMMARY OF THE INVENTION

One aspect of the invention is to provide an information processor that properly performs an adjustment function when a sleep function for a control system is used in combination with the adjustment function that operates independently of the control system.

According to one aspect of the invention, an information processor may include a control device that calculates various kinds of data and controls the information processor, an independent operating device that works independently of the control device, an operational condition switching device that switches the control device to a sleep condition or an active condition, according to predetermined conditions, an adjustment function that works to adjust an operational condition related to the independent operating part, at a predetermined adjustment time, as an operation executed by the control device, and a condition input device that inputs a recovery condition to the operational condition switching device, so as to switch the control device from the sleep condition to the active condition, at the adjustment time when the control device executes the adjustment function or at a predetermined time before the adjustment time.

In the information processor, as the recovery condition is input at the adjustment time when the adjustment function is executed, or for example, one second, one minute, or one hour before the adjustment time, while the control device is in the sleep condition, the control device is switched to the active condition. Therefore, the control device placed in the active condition at the adjustment time can execute the adjustment function. After the adjustment function is executed, various processing may be performed, based on the independent operating device, whose operational condition is properly adjusted.

In the information processor of the invention, the independent operating device may include a clock device that counts a current time independently of the control device. The adjustment function works to adjust the current time counted by the clock device, at a predetermined adjustment time or times. The condition input device inputs the recovery condition, to the operational condition switching device, so as to switch the control device from the sleep condition to the active condition, when the current time counted by the clock device measures the adjustment time or a predetermined time before the adjustment time.

As the recovery condition is input, at the adjustment time when the current time counted by the clock device is adjusted, or for example, one second, one minute, or one hour before the adjustment time, while the control device is in the sleep condition, the control device is switched to the active condition. Therefore, the control device placed under the active condition at the adjustment time, can execute the adjustment of the current time. After that, various processing may be performed, based on the current time properly adjusted.

In the information processor of the invention, the independent operating device may include a clock device that counts a current time independently of the control device. The information processor may include a time correction mode in which a predetermined correction processing is performed for the current time counted by the clock device, to output the current time, when the control device is in the active condition. The adjustment function works to adjust the time correction mode setting of on or off, at a predetermined adjustment time. The condition input device inputs the recovery condition to the operational condition switching device so as to switch the control device from the sleep condition to the active condition when the current time counted by the clock device measures the adjustment time or a predetermined tire before the adjustment time.

As the recovery condition is input, at the adjustment time when the time correction mode setting of on or off is adjusted, or for example, one second, one minute, or one hour before the adjustment time, while the control device is in the sleep condition, the control device is switched to the active condition. Therefore, the control device placed under the active condition at the adjustment time can execute the adjustment of the time correction mode setting. After that, various processing may be performed based on the time output according to the modes properly adjusted.

In the information processor of the invention, the control device may include a display function for displaying the current time in the active condition.

Therefore, the user can understand the current time when the control device is in the active condition. When the control device is in the sleep condition, the current time is not displayed. However, the counting of the current time by the clock device working independently, continues. Therefore, the current time can be displayed immediately as the control device is placed in the active condition. Even when the adjustment time comes while the control device is in the sleep condition, the adjustment of the current time or the time correction mode setting is executed. Thereafter, the adjusted time can be displayed as the current time.

After a certain time has elapsed since the condition input device inputs the recovery condition to the operational condition switching device, the condition input device inputs a resume condition to the operational condition switching device so as to switch the control device to the sleep condition from the active condition.

After a certain time has elapsed since the recovery condition is input, more specifically, after the adjustment time has passed, the control device is switched back from the active condition to the sleep condition by inputting the resume condition. Therefore, power savings can be achieved by performing the sleep function again, after the operational condition is properly adjusted.

The condition input device variably controls a time when the recover condition or the resume condition is input, according to the user's setting.

The time when the control device is switched from the sleep condition to the active condition, or from the active condition to the sleep condition, by inputting the recovery condition or the resume condition, can be changed freely. For example, the time between the recovery condition input and the resume condition input may be set short and the power-saving time may be increased by setting the switch time short. In other words, the power-saving time is increased by the amount that the switch time is decreased.

The operational condition switching device switches the control device to the sleep condition from the active condition, as idleness in which the recovery condition to be input by the condition input device, or an external condition is not input, continues during a predetermined monitoring time.

As idleness in which no external condition, for example, key operations by a user and signal transmission or reception, is input continues during the predetermined monitoring time, the control device is automatically switched to the sleep condition from the active condition. Therefore, the sleep function that achieves power savings by reducing standby power consumption may be realized.

The operational condition switching device switches the control device to the active condition due to the external condition input during the sleep condition.

The control device placed under the sleep condition is switched to the active condition at the time when the external condition is input. Therefore, the information processor may be used immediately when the user would like to use the information processor. The practical sleep function may be also realized.

The operational condition switching device variably controls the monitoring time, according to the user's setting.

The user can freely change the monitoring time, based on which the control device is switched to the sleep condition. For example, as if the monitoring time is set short, the power-saving time can be increased. In other words, the power-saving time is increased by the amount that the monitoring time is decreased.

The information processor may further include a switching operation permitting/prohibiting device that permits or prohibits an operation of the operational condition switching device, according to the user's setting.

The user can make a setting so as to stop the sleep function, according to the frequency of use of the information processor. The user can thus determine whether the sleep function is used.

The information processor may further include an adjustment permitting/prohibiting device that permits or prohibits an execution of the adjustment function by the control device, according to the user's setting.

The user can make a setting so as to stop the adjustment function, according to the usage condition of the information processor. The user can thus determine whether the adjustment function is used.

BRIEF DESCRIPTION OF THE DRAWINGS

Various exemplary embodiments of the invention will be described in detail with reference to the following figures wherein:

FIG. 2 is a flowchart illustrating an operation of a clock adjustment function;

Further objects, details, and advantages of the invention will be apparent from the following detailed description, when read in conjunction with the drawings.

DETAILED DESCRIPTION OF PREFERRED EMBODIMENTS

Various exemplary embodiments of the invention will be described in detail with reference to the figures.

Figure 1A:
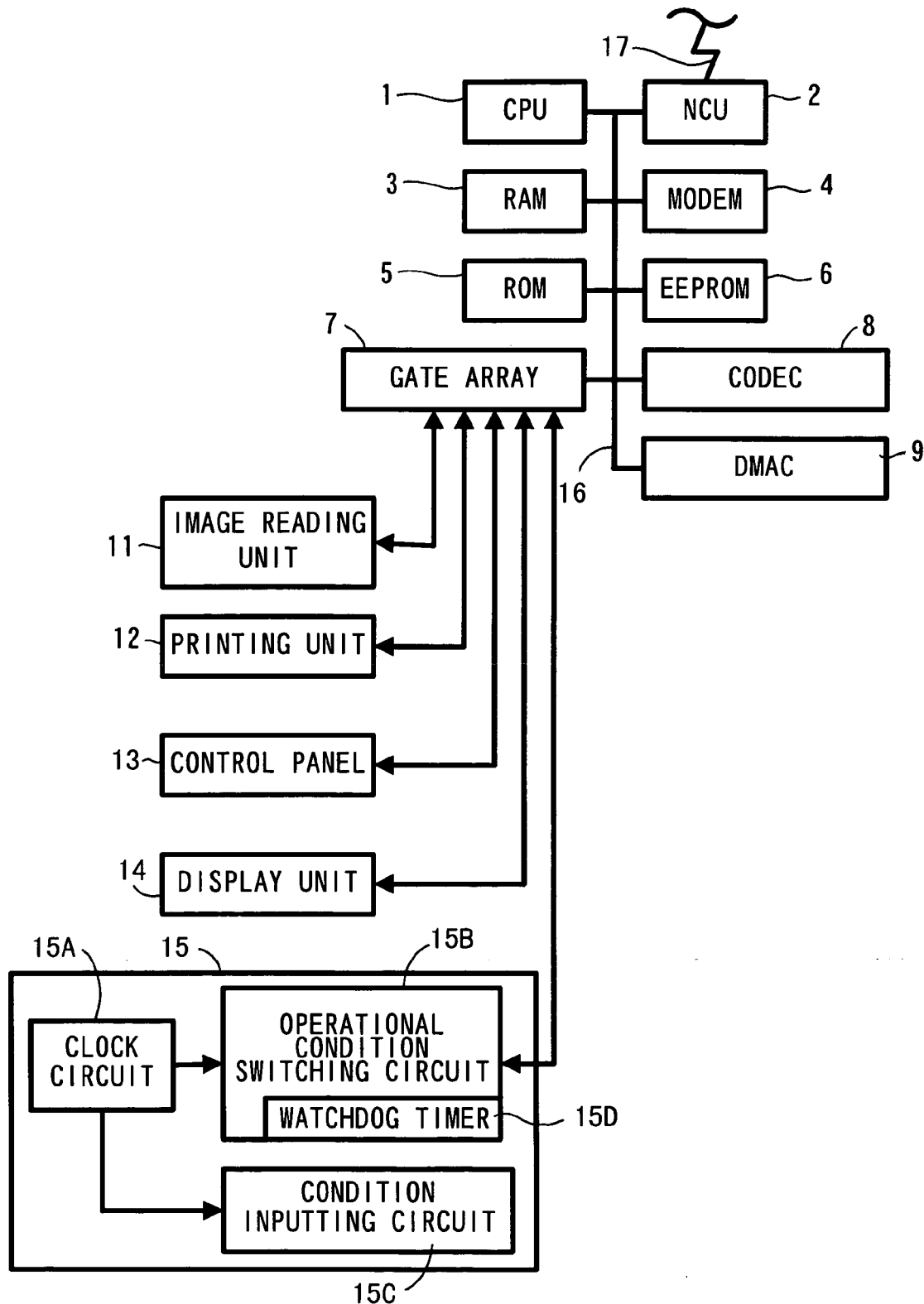
FIG. 1A is a block diagram of an information processor according to an exemplary embodiment of the invention.

FIG. 1A is a block diagram of an information processor according to an exemplary embodiment of the invention. The information processor may be included inside of, for example, a facsimile apparatus. The information processor includes the following components: a central processing unit (CPU) 1; a network control unit (NCU) 2; a random-access memory (RAM) 3; a modem 4; a read-only memory (ROM) 5; an electrically erasable programmable read-only memory (EEPROM) 6; a gate array 7; a CODEC 8; a direct memory access controller (DMAC) 9; an image reading unit 11; a printing unit 12; a control panel 13; a display unit 14, and an input/output (I/O) monitor 15. The CPU 1, the NCU 2, the RAM 3, the modem 4, the ROM 5, the EEPROM 6, the gate array 7, the CODEC 8, and the DMAC 9 are connected with each other by a bus line 16. The bus line 16 includes an address bus, a data bus, and a control signal line. The image reading unit 11, the printing unit 12, the control panel 13, the display unit 14, and the I/O monitor 15 are connected to the gate array 7.

The CPU 1 controls the operations of the facsimile apparatus. The NCU 2, which is connected to a public telephone line 17, performs the network controls. The backup battery of the RAM 3 may be, for example, a charging battery, and the RAM 3 provides space for the operations by the CPU 1. The modem 4 modulates and demodulates facsimile data. The ROM 5 stores various kinds of programs and data, such as setting values. The EEPROM 6 stores various kinds of flags and setting data. The gate array 7 functions as an input/output interface of the CPU 1. The CODEC 8 encodes and decodes the facsimile data. The DMAC 9 writes data into, and reads data from, the RAM 3.

Figure 1B:
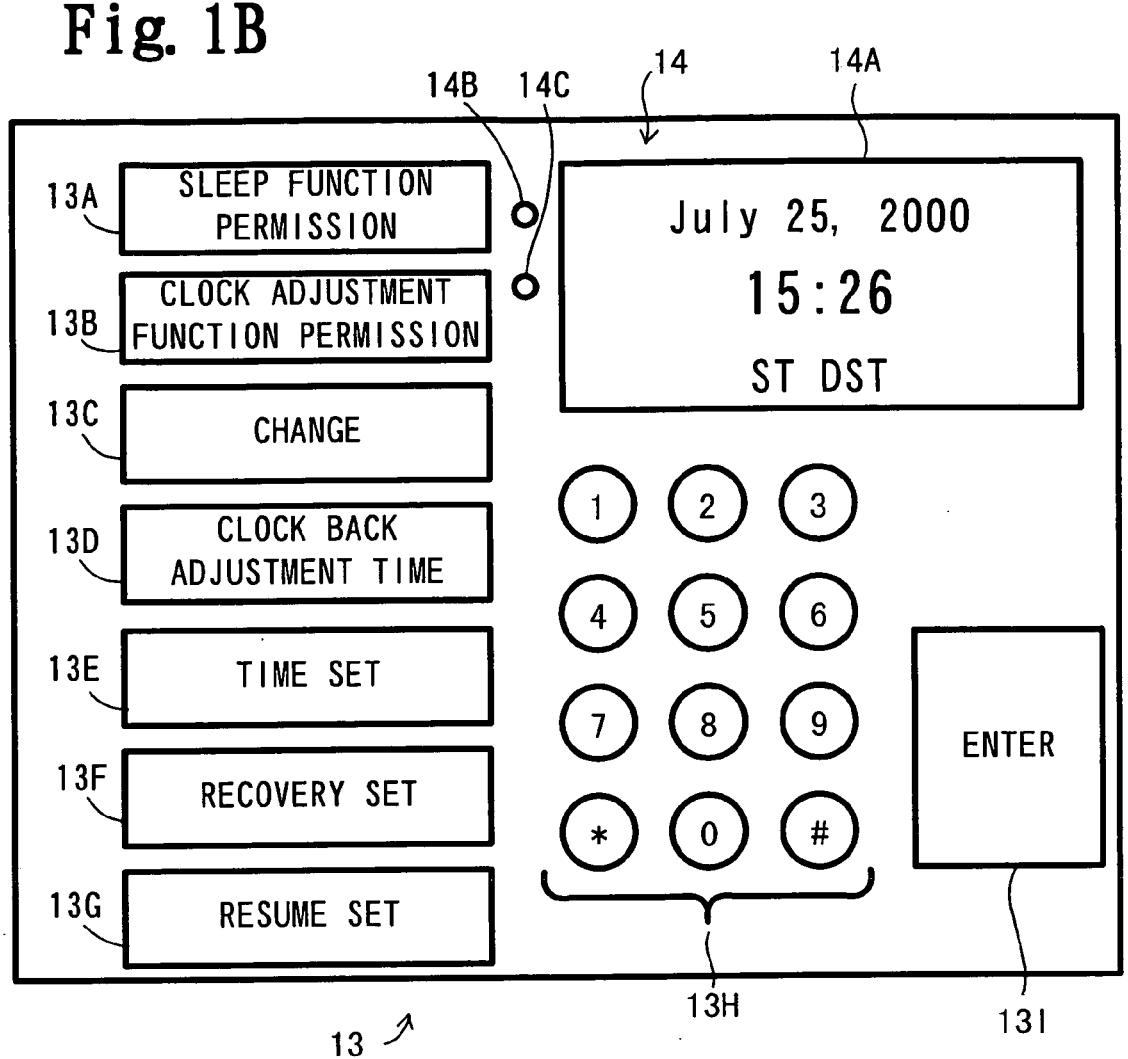
FIG. 1B is a plan view showing a control panel and a display of an exemplary embodiment of the invention.

The image reading unit 11 reads from an original document an image to be sent. The printing unit 12 reproduces a received image onto a recording paper, by a printing device of, for example, an ink-jet type, a laser type, or a thermal transfer type. The control panel 13 has various keys that convey to the CPU 1 a signal input by the user's key operation, such as for a telephone call and a facsimile transmission/reception. As shown in FIG. 1B, the control panel 13 has a sleep function permission key 13A, a clock adjustment function permission key 13B, a change key 13C, a clock back adjustment time key 13D, a time set key 13E, a recovery set key 13F, a resume set key 13G, a ten-key numerical keypad 13H, and an OK key 13I. It should be appreciated that the control panel 13 may also include other function keys.

The display unit 14 is provided with a display panel 14A made up, for example, of a liquid crystal display (LCD) or a light-emitting diode (LED), and LEDs 14B, 14C. The display unit 14 shows various information, such as the status and setting information of the facsimile apparatus, as well as a time. In this embodiment, the display panel 14A is an LCD. The display panel 14A of FIG. 1B shows the current date and the current time. The display panel 14A is capable of displaying whether the date and time is based on the standard time (ST) or the daylight-saving time (DST). In FIG. 1B, both "ST" and "DST" are displayed. However, the display panel 14A actually indicates only "ST" or "DST".

The sleep function permission key 13A may be a toggle switch. When the user presses the sleep function permission key 13A once, the LED 14B comes on, and the facsimile apparatus is permitted to perform the sleep function. When the user presses it once again, the LED 14B goes out, and the facsimile apparatus is prohibited from performing the sleep function. Accordingly, it is easy for the user to recognize whether the sleep function of the facsimile apparatus is useable from the status of the LED 14B.

The clock adjustment function permission key 13B may also be a toggle switch. When the user presses the 13B once, the LED 14C comes on, and the facsimile apparatus is permitted to perform the clock adjustment function. When the user presses it once again, the LED 14C goes out, and the facsimile apparatus is prohibited from performing the clock adjustment function. Accordingly, it is easy for the user to recognize whether the clock adjustment function of the facsimile apparatus is useable from the status of the LED 14C.

The change key 13C enables the user to set a clock forward adjustment time which will be described later. When the user presses the change key 13C once, the display panel 14A is shifted to a screen where a clock forward adjustment time can be set (not shown). On the screen, the user inputs a desired clock forward adjustment time using the ten-key numerical keypad 13H, and presses the OK key 13I at the end to set the input clock forward adjustment time.

The clock back adjustment time key 13D is a key enabling a user to set a clock back adjustment time which will be described later. When the user presses the clock back adjustment time key 13D once, the display panel 14A is shifted to a screen where a clock back adjustment time can be set (not shown). On the screen, the user inputs a desired clock back adjustment time using the ten-key numerical keypad 13H, and presses the OK key 13I at the end to set the input clock back adjustment time.

The time set key 13E is a key enabling the user to correctly set a time measured by a clock circuit 15A, which will be described later. When the user presses the time set key 13E, the display panel 14A is shifted to a screen where a time can be set (not shown). On the screen, the user inputs the correct time using the ten-key numerical keypad 13H, and presses the OK key 13I at the end to set the input correct time.

The recovery set key 13F is a key enabling the user to set a timing of when a condition inputting circuit 15C inputs a recovery condition it generates to an operational condition switching circuit 15B before the clock adjustment time approaches. When the user presses the recovery set key 13F, the display panel 14A is shifted to a recovery setting screen (not shown). On the screen, the user inputs a time to input the recovery condition using the ten-key numerical keypad 13H, and presses the OK key 13I at the end to set the time to input the recovery condition.

The resume set key 13G is a key enabling the user to set a timing of when the condition inputting circuit 15C inputs a resume condition to the operational condition switching circuit 15B after the clock adjustment time comes. When the user presses the resume key 13G, the display panel 14A is shifted to a resume setting screen (not shown). On the screen, the user inputs a time to input the resume condition using the ten-key numerical keypad 13H, and presses the OK key 13I at the end to set the time to input the resume condition.

The I/O monitor 15 may be a hardware circuit that operates independently of the CPU 1. The I/O monitor 15 includes the clock circuit 15A that measures the current time of a location where the facsimile apparatus is used, the operational condition switching circuit 15B, and the condition inputting circuit 15C. The I/O monitor 15 will be explained in detail below.

Although it is not shown in FIG. 1A, the facsimile apparatus may be connected, via a serial or a parallel cable, to another apparatus such as a personal computer, so that the facsimile apparatus may be used as a printer or a scanner.

The CPU 1 uses the current time obtained from the clock circuit 15A as the current time. To adjust for the beginning of daylight-saving time, the CPU 1 includes, as one operation mode thereof, a time correction mode to switch from current time to forward adjusted time one hour ahead of the current time so that the forward adjusted time is managed as the current time during daylight-saving time. The CPU 1 switches the time correction mode setting. At the beginning of daylight-saving time, the time correction mode setting is switched from "OFF" to "ON," so that the forward adjusted time is used as the current time. The time correction mode setting condition is stored in the EEPROM 6. The EEPROM 6 includes a time correction mode flag inside. When the CPU 1 turns the time correction mode flag on, the time correction mode setting is switched from "OFF" to "ON." When the CPU 1 turns the time correction mode flag off, the time correction mode setting is switched from "ON" to "OFF."

For example, when daylight-saving time begins on the second of April and ends on the twenty-ninth of October, the CPU 1 switches the time correction mode on, as the clock circuit 15A measures 2:00 am. on the 2nd of April. Further, the CPU 1 starts the processing to output 3:00 am. as the current time, by turning the clock forward one hour from the standard time measured by the clock circuit 15A. During daylight-saving time, the time correction mode stays on, and the CPU 1 always manages the time one hour ahead of standard time as the current time and uses it for a display function. When the time measured by the clock circuit 15A tells 2:00 am. on the thirtieth of October, the CPU switches the time correction mode off, to adjust the time back to standard time. The function to switch the time correction mode on and off is performed by providing the clock circuit 15A that works independently of the operation of the CPU 1. The execution of the time correction mode may be permitted or prohibited, based on the above-mentioned user's setting. The timing when the clock correction mode is automatically switched on and off is referred to as a clock adjustment time.

The facsimile apparatus includes a power saving sleep function, since it is not always performing particular jobs, but is idle most of the time. The sleep function is a function to make the CPU 1 and the modem 4 go from an active condition into a sleep condition where power supply is stopped. The sleep function automatically works after a certain period of idleness in which no actions, such as a user's key operation and reception of signals from another apparatus (hereinafter each referred to as an external condition), are performed. The sleep function is performed by the I/O monitor 15, which will be explained below.

The I/O monitor 15 monitors the above-described external conditions, independently of the CPU 1. In this embodiment, the I/O monitor 15 may be a hardware circuit. The I/O monitor 15 includes the above-described clock circuit 15A, and the operational condition switching circuit 15B that makes the CPU 1 switch between the sleep and active conditions according to the external conditions. The operational condition switching circuit 15B includes a circuit that detects that any external condition is input, and a watchdog timer 15D that counts or measures the waiting time from the previous external condition, and cancels the wait after some period of time. The time counted by the watchdog timer 15D until the wait is canceled is hereinafter referred to as a monitoring time. When no external condition is detected during the monitoring time, the operational condition switching circuit 15B switches the active condition of the CPU 1 to the sleep condition. On the other hand, when an external condition is detected during the monitoring time, the operational condition switching circuit 15B resets the watchdog timer 15D and continues to monitor the external conditions. When an external condition is detected under the sleep condition of the CPU 1, the operational condition switching circuit 15B immediately switches the sleep condition of the CPU 1 to the active condition. The execution of the sleep function may be permitted or prohibited according to the user's setting, as described above. The monitoring time to switch to the sleep condition may be freely set by the user, to any length of time, for example, 10 minutes or an hour, as described above. The monitoring time is adjustably managed by the operational condition switching circuit 15B.

In the related art discussed above, when the clock adjustment function is used in combination with the sleep function, the clock adjustment function may not perform properly as the CPU 1 may be placed in the sleep condition at the clock adjustment time. Therefore, to solve this problem, the condition inputting circuit 15C is embedded in the I/O monitor 15 in the facsimile apparatus. The condition inputting circuit 15C generates a pseudo recovery condition, for example, just at the clock adjustment time, or a certain time prior to the clock adjustment time, for example a second, a minute or an hour before the clock adjustment time. Then, the condition inputting circuit 15C inputs the recovery condition to the operational condition switching circuit 15B. The operational condition switching circuit 15B switches the sleep condition of the CPU 1 to the active condition. As a certain time elapses after the input of the recovery condition to the operational condition switching circuit 15B, the condition inputting circuit 15C generates a resume condition, contrary to the recovery condition, to order the operational condition switching circuit 15B to switch the active condition of the CPU 1 to the sleep condition. As the resume condition is input to the operational condition switching circuit 15B, the CPU 1 can be placed back in the sleep condition. In the condition inputting circuit 15C, the input timing of the recovery and resume condition is adjustably controlled with respect to the clock adjustment time. The timing of inputting such conditions may be freely set by a user, as described above.

In other words, the CPU 1 calculates various kinds of data, controls the operations of the apparatus, and renews the operational status of the clock circuit 15A that operates independently at a predetermined clock adjustment time. The operational condition switching circuit 15B switches the CPU 1 to the sleep/active condition according to the predetermined conditions. The condition inputting circuit 15C inputs a recovery condition to switch the CPU 1 from the sleep condition to the active condition, to the operational condition switching device at the time the controlling device performs clock adjustment function or at the time set ahead a certain time.

The operations of the facsimile apparatus having the above-described structure, specially the operation when the clock adjustment function is used in combination with the sleep function, will be described with reference to the figures.

FIG. 2 is a flowchart illustrating an operation of the CPU 1 that executes the clock adjustment function. As shown in FIG. 2, the CPU 1 determines whether the clock adjustment is permitted, based on the user's setting information (S1). The permission is given when the user presses the clock adjustment function permission key 13B on the control panel 13. The EEPROM 6 stores the user's setting information.

When the clock adjustment is permitted (S1: YES), the CPU 1 determines, based on the current time obtained from the clock circuit 15A, whether the current time is the clock forward adjustment time, which is one of the clock adjustment times to be performed twice a year (S2). The clock forward adjustment time is stored in the EEPROM 6, for example, as an hour ahead of the start time and the start day of daylight-saving time. The clock forward adjustment time may be freely set by the user as described above. In general, the clock forward adjustment is performed once a year.

When the current time is the clock forward adjustment time (S2: YES), the CPU 1 switches the time correction mode to "ON" from "OFF," so as to set the time, for example, an hour ahead of 2:00 am. (S3). When the time correction mode is switched to "ON," the forward adjusted time is managed as the current time. The current time is indicated, for example, on the display panel 14A. At this time, the display panel 14A shows "DST," not "ST."

Figure 3:
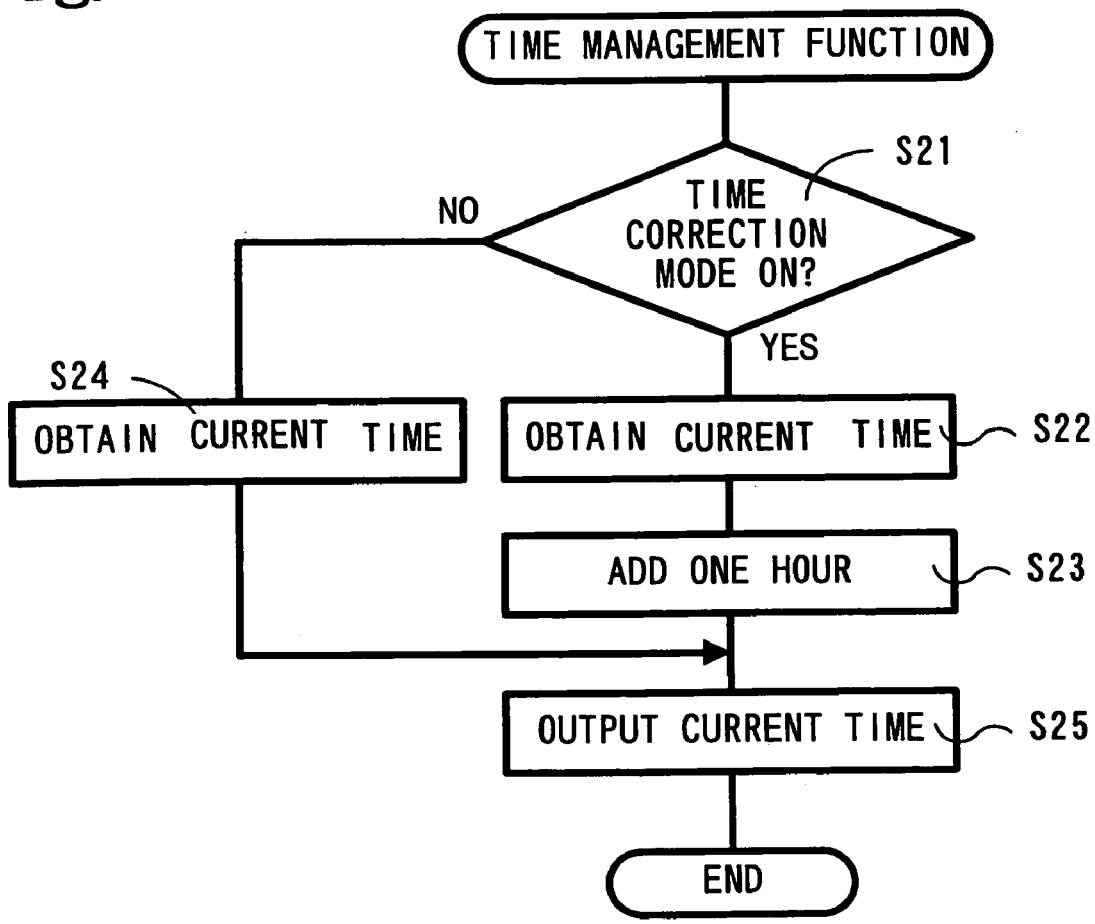
FIG. 3 is a flowchart illustrating an operation of a time management function.

As a time management function as shown in FIG. 3, the CPU 1 determines whether the time correction mode is set to ON (S21). If the time correction mode is set to ON (S21: YES), the CPU 1 obtains the current time from the clock circuit 15A (S22), adds one hour to the current time (S23), and outputs the added time as the current time (S25).

However, if the CPU 1 determines the time correction mode is set to OFF (S21: NO), it obtains the current time from the clock circuit 15A (S24), and outputs it as the current time without calculation (S25).

After the time correction mode is set to ON, the forward adjusted time is the current time until the clock is set back. The current time in the clock circuit 15A is preset before the shipment of the apparatus. However, as described above, the user can set a time.

In S2 of FIG. 2, when the current time is not the clock forward adjustment time (S2: NO), the CPU 1 determines whether it is a clock back adjustment time, based on the standard time (S4). The clock back adjustment time is paired with the above-described clock forward adjustment time, and stored in the EEPROM 6, for example, as an hour behind the end of daylight-saving time. The clock back adjustment time may be freely set by the user, similar to the above-described clock forward adjustment time. In general, the clock back adjustment is performed once a year.

When the current time is the clock back adjustment time (S4: YES), the CPU 1 switches the time correction mode to "OFF" from "ON," so as to manage standard time as the current time (S5). When the time correction mode is switched to "OFF," the CPU 1 manages standard time as the current time as shown in FIG. 3. The current time is indicated, for example, on the display panel 14A. At this time, the display panel 14A shows "ST," not "DST." After the time correction mode is switched to "OFF," standard time is used as the current time and is employed for various processes, such as display indication, until standard time is switched to the clock forward adjustment time.

In S4, when the current time does not reach the clock back adjustment time (S4: NO), that is, when it is neither the clock forward adjustment time, nor the clock back adjustment time, the CPU 1 continues a current operation, without performing the clock adjustment. During daylight-saving time, the forward adjusted time is managed as the current time. During a period other than daylight-saving time, standard time is managed as the current time. When the CPU 1 is placed in the sleep condition, the display panel 14A does not indicate the time. The display panel 14A may display a message, for example, "SLEEP MODE," by the use of an internal circuit of the display panel 14A.

In S1, when the clock adjustment is not permitted based on the user's setting (S1: NO), the CPU 1 continues a current operation, without performing the clock adjustment.

Figure 4:
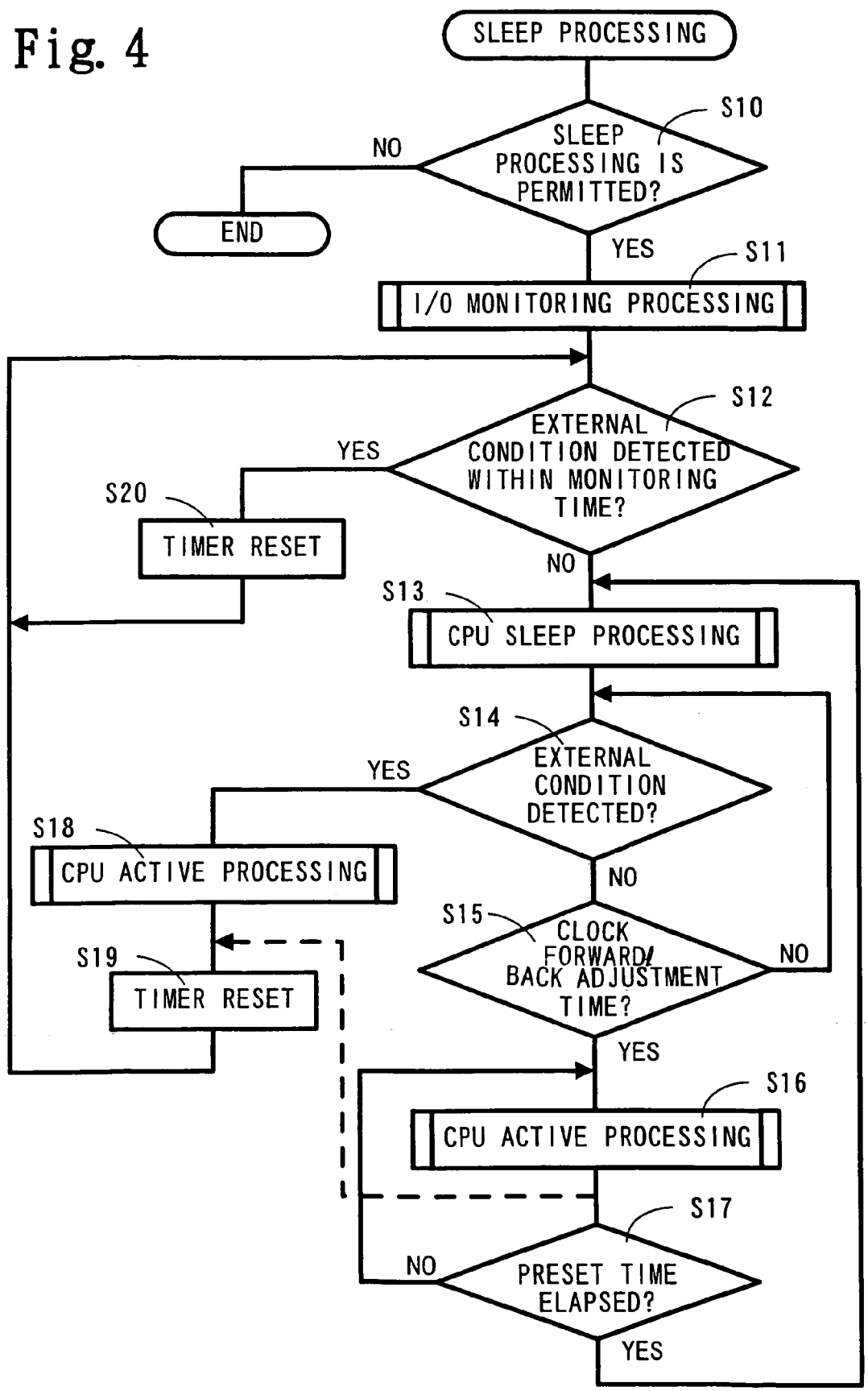
FIG. 4 is a flowchart illustrating an operation of a sleep processing function.

FIG. 4 is a flowchart illustrating an operation of the I/O monitor 15 that executes the sleep function. As shown in FIG. 4, the I/O monitor 15 determines whether a sleep processing is permitted, based on the user's setting information (S10). The permission is given when a user presses the sleep function permission key 13A on the control panel 13. The EEPROM 6 stores the user's setting information.

When the sleep processing is permitted (S10: YES), the I/O monitor 15 monitors any inputs/outputs, using the watchdog timer 15D (S11). Monitoring inputs/outputs detects external conditions related to input-output operations within a certain time. The following external conditions may be detected: external transmission and reception of data with the modem 4, on- and off-hook conditions, a printing operation, and an image reading operation. The monitoring time may be freely set by a user, to any length of time, for example, ten minutes or an hour. The monitoring time is managed by the operational condition switching circuit 15B.

In the input/output monitoring, when no external condition is detected during the monitoring time (S12: NO), the I/O monitor 15 interrupts the power supply to the CPU 1 and the modem 4, by the use of the operational condition switching circuit 15B. The CPU 1 is switched to the sleep condition (S13). The CPU 1 enters a state that it does not execute the time correction mode switching (S3 and S5) in FIG. 2, which is automatically executed. The display panel 14A of the display unit 14 may indicate a message, for example, "SLEEP MODE."

After the I/O monitor 15 starts the sleep processing for the CPU 1, in S13, the I/O monitor 15 detects whether any external condition is input (S14) as with S12. At this time, the monitoring time is not counted by the watchdog timer 15D.

When no external condition is detected during the sleep condition of the CPU 1 (S14: NO), and the current time approaches the clock forward or back adjustment time (S15: YES), the I/O monitor 15 starts the power supply to the CPU 1 and the modem 4, by the use of the operational condition switching circuit 15B, contrary to S13. The CPU 1 is switched to the active condition (S16). In this case, the recovery condition is input as a signal, from the condition inputting circuit 15C, to the operational condition switching circuit 15B, in order to switch the condition of the CPU 1 from the sleep condition to the active condition. The CPU 1 is placed in a condition that the CPU 1 is able to automatically execute the time correction mode switching (S3 and S5) in FIG. 2. The time correction mode switching is instantly performed.

When the I/O monitor 15 starts the activating processing for the CPU 1 in S16, the I/O monitor 15 monitors whether the preset time has elapsed, by counting the time with the watchdog timer 15D (S17). When the preset time has elapsed (S17: YES), the flow returns to S13, where the I/O monitor 15 switches the condition of the CPU 1 to the sleep condition. In this case, the resume condition is input as a signal, from the condition inputting circuit 15C, to the operational condition switching circuit 15B, in order to switch the condition of the CPU 1 from the active condition to the sleep condition.

The preset time, which is counted in S17, may be freely set by the user, to any length of time, for example, one minute or ten minutes. The preset time is managed by the operational condition switching circuit 15B. The preset time is preferably as short as possible, as the time correction mode switching in step S3 or S5 is instantly performed when the CPU 1 is in the active condition in S16.

When the preset time has not yet elapsed (S17: NO) after the start of the activating processing for the CPU 1 in S16, the flow goes back to S16, where the I/O monitor 15 maintains the active condition of the CPU 1, until the preset time elapses. As a replacement for S17, the sequence after the processing in S16, as shown by the dotted line, may be configured in such a manner that the watch dog timer 15D is reset (S19), and then back to S12.

In S15, when the current time is not the clock forward or back adjustment time (S15: NO) even while the CPU 1 is in the sleep condition, flow returns to S14 where the I/O monitor 15 monitors whether any external condition is input.

In S14, when any external condition is detected (S14: YES) while the CPU 1 is in the sleep condition, the I/O monitor 15 starts the activating processing for the CPU 1 (S18), similar to step S16.

After starting the activating processing for the CPU 1, the I/O monitor 15 resets the watchdog timer 15D (S119). Thereafter, the I/O monitor 15 monitors in step S12 whether any external condition is input. The CPU 1 and the modem 4 are now placed in the active condition, so that operations, for example, transmission and reception of data with the modem 4, a processing attendant on the on- and off-hook operations, a printing operation, and an image reading operation, can be performed.

In S12, when any external condition is detected during the monitoring time (S12: YES), the I/O monitor 15 resets the watchdog timer 15D (S20), similar to S19. Thereafter, flow returns to S12.

In S10, when the sleep processing is not permitted according to the user's setting (S10: NO), the I/O monitor 15 does not perform the sleep processing, so that the CPU 1 is in the active condition, where various operations can be performed, with power supplied to the CPU 1. When the sleep processing is not permitted, predetermined processings are performed at the clock adjustment times such as the clock forward and back adjustments, without any hindrance to the operation of the CPU 1. When the sleep processing is permitted, the I/O monitor 15 repeatedly monitors whether any external condition is input. Even when the clock forward or back adjustment timing comes while the CPU 1 is in the sleep condition, the CPU 1 is temporarily placed in the active condition, so that the predetermined processing can be performed.

In the facsimile apparatus having the above-described structures and that performs the above-described operations, even while the CPU 1 is in the sleep condition, the CPU 1 is automatically switched from the sleep condition to the active condition at the time when the clock adjustment timing comes. Therefore, the clock adjustment function can be executed at the clock adjustment timing, with the CPU 1 placed in the active condition. After the execution of the clock adjustment function, the properly adjusted time is used as the current time.

After the expiration of a preset time since the CPU 1 has been switched to the active condition for the clock adjustment function, the CPU 1 is switched again to the sleep condition. Therefore, after the proper clock adjustment, power savings can be achieved using the sleep function.

In FIG. 2, the time adjustment is performed in the time correction mode where a certain time is added to the current time counted by the clock circuit 15A so as to correspond to daylight-saving time. However, the time counted by the clock circuit 15A may be corrected directly so as to correspond to daylight-saving time. Correcting the time counted by the clock circuit 15A to daylight-saving time depends on the specifications of the clock circuit. If the time counted by the clock circuit 15A is corrected, when it reaches the preset clock forward adjustment time, instead of S3, the time counted by the clock circuit is moved forward by one hour, for example. Then, the clock circuit continues to count the time from the time one hour ahead. When the time reaches the preset clock back adjustment time, instead of S5, the time counted by the clock circuit is set back one hour. The clock circuit continues to count the time from the time one hour back. Therefore, the output of the clock circuit itself is regarded as the current time, and is used for the display function and communication capabilities using the time information when the CPU 1 is placed in the active condition.

Figure 5:
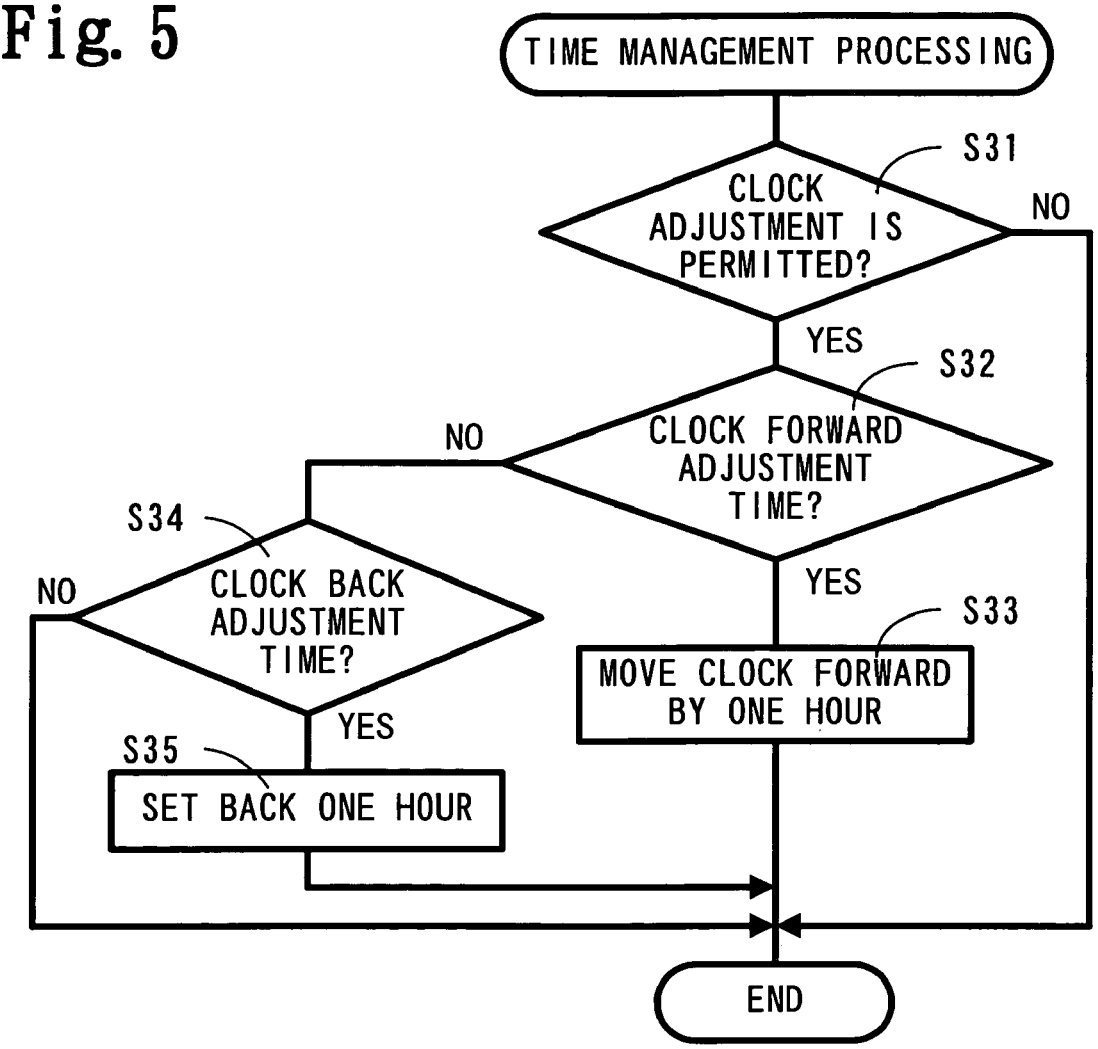
FIG. 5 is a flowchart illustrating an operation of another clock time adjustment function.

Specifically, as shown in FIG. 5, the CPU 1 determines whether the clock adjustment is permitted, based on the user's setting information (S31). The permission is given when the user presses the clock adjustment function permission key 13B on the control panel 13, as described above. The EEPROM 6 stores the user's setting information.

When the clock adjustment is permitted (S31: YES), the CPU 1 determines, based on the current time obtained from the clock circuit 15A, whether the current time is the clock forward adjustment time, which is one of the clock adjustment times to be performed twice a year (S32). The clock forward adjustment time is stored in the EEPROM 6, for example, as an hour ahead of the start time and the start day of daylight-saving time. The clock forward adjustment time may be freely set by the user as described above. In general, the clock forward adjustment is performed once a year.

When it is the clock forward adjustment time (S32: YES), the CPU 1 turns the clock forward one hour from the time counted by the clock circuit 15A (S33), so as to add one hour to the current time, for example, 2:00 am. From then on, the clock circuit 15A counts the time one hour ahead of the current time as the current time. The current time is indicated, for example, on the display panel 14A.

After the time in the clock circuit 15A is turned forward by one hour, the time corresponding to daylight-saving time is the current time until the clock back adjustment time.

When the current time is not the clock forward adjustment time (S32: NO), the CPU 1 determines whether the current time is the clock back adjustment time (S34). When the current time is the clock back adjustment time (S34: YES), the CPU 1 sets back the time counted by the clock circuit 15A one hour, so as to return it to standard time (S35). Hereafter, standard time is managed as the current time and used for the display panel 14A. After the time in the clock circuit 15A has been set back to standard time, standard time is used as the current time for processings, such as displaying, until standard time reaches the clock forward adjustment time corresponding to daylight-saving time.

In S34, when the standard time does not reach the clock back adjustment time (S34: NO), that is, when it is neither the clock forward adjustment time nor the clock back adjustment time, the CPU 1 continues a current operation, without performing the clock adjustment. During daylight-saving time, the forward adjusted time is managed as the current time. During a period other than daylight-saving time, standard time is managed as the current time.

In S31, when the clock adjustment is not permitted according to the user's setting (S31: NO), the CPU 1 continues a current operation, without performing the clock adjustment.

In this embodiment, the facsimile apparatus is positioned as an example of an apparatus having an information processor related to the invention. However, otherwise it can be other type of device such as a phone. Although devices to be embodied may be widespread, preferably, the invention is applied to an apparatus capable of displaying a time and storing information.

Further, this embodiment describes a usage form particularly suitable to the daylight-saving time as a function requiring to change the time at a predetermined timing. This usage form is just one example. Such a timing may occur many times a year. The facsimile apparatus may be structured to display a time set late by a certain time behind the standard time. In addition, any function other than the clock adjustment may be described.

This embodiment describes the invention using daylight-saving time as an example, however, it can be used for timer transmission and other purposes. A conventionally known facsimile apparatus has a timer transmission function for transmitting copies of documents to a receiver's facsimile apparatus at a designated time. As an another embodiment of the invention, when a time set for a timer transmission approaches, the CPU 1 placed in the sleep condition can be switched to the active condition, in order to make the facsimile apparatus transmit copies of documents to the receiver's facsimile apparatus, and then switched again to the sleep condition. Specifically, step S15 of FIG. 4 can be changed to "timer transmission time?" and a step of "timer transmission" can be inserted between steps S16 and S17. In addition, regarding step S17 as a step of timer transmission, the flow can go to S19. In the step of timer transmission, the facsimile apparatus is considered to transmit copies of documents, which are previously memorized therein or placed on the reading unit 11, to the receiver's facsimile apparatus at the time designated by the user.

While the invention has been described with reference to the embodiments, it is to be understood that the invention is not restricted to the particular forms shown in the foregoing embodiments. Various modifications and alternations can be made thereto without departing from the scope of the invention.

What is claimed is:

1. A facsimile apparatus, comprising:
    an image reading unit that reads from an original document an image to be sent;
    a printing unit that reproduces a received image onto recording paper;
    a control device that calculates various kinds of data and controls the image reading unit and the printing unit;
    an operating device that works separately of the control device;
    an operational condition switching device that switches the control device to a sleep condition or an active condition, according to predetermined conditions, wherein the operational condition switching device is a part of the operating device;
    an adjustment device that adjusts an operational condition related to the operating device, at a predetermined adjustment time, wherein the adjustment device is a part of the control device; and
    a condition input device that inputs a recovery condition to the operational condition switching device, so as to switch the control device from the sleep condition to the active condition, at the predetermined adjustment time when the control device executes the adjustment or at a predetermined time before the predetermined adjustment time, wherein the condition input device is a part of the operating device, wherein:
        the operating device includes a clock device that counts a current time separately of the control device;
        the adjustment device adjusts the current time counted by the clock device, at the predetermined adjustment time; and
        the condition input device inputs the recovery condition to the operational condition switching device, so as to switch the control device from the sleep condition to the active condition, when the current time counted by the clock device measures the predetermined adjustment time or at a predetermined time before the predetermined adjustment time.

2. The facsimile apparatus according to claim 1, wherein the control device includes a display function for displaying the current time in the active condition.

3. The facsimile apparatus according to claim 1, wherein after a certain time has elapsed since the condition input device inputs the recovery condition to the operational condition switching device, the condition input device inputs a resume condition to the operational condition switching device so as to switch the control device to the sleep condition from the active condition.

4. The facsimile apparatus according to claim 3, wherein the condition input device variably controls a time when the recover condition or the resume condition is input, according to a user's setting.

5. The facsimile apparatus according to claim 1, wherein the operational condition switching device switches the control device to the sleep condition from the active condition, as idleness in which the recovery condition to be input by the condition input device, or an external condition is not input, continues during a predetermined monitoring time.

6. The facsimile apparatus according to claim 5, wherein the operational condition switching device switches the control device to the active condition, due to the external condition input during the sleep condition.

7. The facsimile apparatus according to claim 5, wherein the operational condition switching device variably controls the monitoring time, according to a user's setting.

8. The facsimile apparatus according to claim 1, further comprising:
    a switching operation permitting/prohibiting device that permits or prohibits an operation of the operational condition switching device, according to a user's setting.

9. The facsimile apparatus according to claim 1, further comprising:
    an adjustment permitting/prohibiting device that permits or prohibits an execution of the adjustment function by the control device, according to a user's setting.

10. A facsimile apparatus, comprising:
    an image reading unit that reads from an original document an image to be sent;
    a printing unit that reproduces a received image onto recording paper;
    a control device that calculates various kinds of data and controls the image reading unit and the printing unit;
    an operating device that works separately of the control device:
    an operational condition switching device that switches the control device to a sleep condition or an active condition, according to predetermined conditions, wherein the operational condition switching device is a part of the operating device;
    an adjustment device that adjusts an operational condition related to the operating device, at a predetermined adjustment time, wherein the adjustment device is a part of the control device; and
    a condition input device that inputs a recovery condition to the operational condition switching device, so as to switch the control device from the sleep condition to the active condition, at the predetermined adjustment time when the control device executes the adjustment or at a predetermined time before the predetermined adjustment time, wherein the condition input device is a part of the operating device, wherein:
        the operating device includes a clock device that counts a current time separately of the control device;
        the facsimile apparatus includes a time correction mode in which a predetermined correction processing is performed for the current time counted by the clock device, to output the current time, when the control device is in the active condition;
        the adjustment device adjusts the time correction mode setting of on or off, at the predetermined adjustment time; and
        the condition input device inputs the recovery condition to the operational condition switching device, so as to switch the control device from the sleep condition to the active condition, when the current time counted by the clock device measures the predetermined adjustment time or at a predetermined time before the predetermined adjustment time.

11. A facsimile apparatus, comprising:
    an image reading unit that reads from an original document an image to be sent;

a printing unit that reproduces a received image onto recording paper;

a control device that calculates various kinds of data and controls the image reading unit and the printing unit; and an input/output monitor that works separately of the control device and that switches the control device to a sleep condition or an active condition, according to predetermined conditions wherein:

the input/output monitor switches the control device from the sleep condition to the active condition at an execution time when the control device executes a predetermined operation or at a predetermined time before the execution time;

the input/output monitor includes a clock device that counts a current time separately of the control device, an operational condition switching device that switches the control device to a sleep condition or an active condition, according to the predetermined conditions, and a condition input device that inputs a recovery condition to the operational condition switching device, so as to switch the control device from the sleep condition to the active condition;

the facsimile apparatus includes a time correction mode in which the current time is output by performing a predetermined correction processing to the current time counted by the clock device, when the control device is in the active condition; and the predetermined operation includes an adjustment of the time correction mode setting of on or off, at the execution time or at the predetermined time before the execution time.

12. The facsimile apparatus according to claim 11, wherein the predetermined operation includes an adjustment of an operational condition related to the clock device at the execution time or at the predetermined time before the execution time.

13. The facsimile apparatus according to claim 12, further comprising:

a switching operation permitting/prohibiting device that permits or prohibits an operation of the operational condition switching device, according to a user's setting.

14. The facsimile apparatus according to claim 12, further comprising:

a predetermined operation permitting/prohibiting device that permits or prohibits an execution of the predetermined operation by the control device, according to a user's setting.

15. The facsimile apparatus according to claim 12, wherein the control device includes a display function for displaying the current time in the active condition.

16. The facsimile apparatus according to claim 12, wherein after a certain time has elapsed since the condition input device inputs the recovery condition to the operational condition switching device, the condition input device inputs a resume condition to the operational condition switching device, so as to switch the control device to the sleep condition from the active condition.

17. The facsimile apparatus according to claim 12, wherein the condition input device variably controls a time when the recovery condition or the resume condition is input, according to a user's setting.

18. The facsimile apparatus according to claim 12, wherein the operational condition switching device switches the control device to the sleep condition from the active condition as idleness in which the recovery condition to be input by the condition input device, or an external condition is not input, continues during a predetermined monitoring time.

19. The facsimile apparatus according to claim 18, wherein the operational condition switching device switches the control device to the active condition, due to the external condition input during the sleep condition.

20. The facsimile apparatus according to claim 18, wherein the operational condition switching device variably controls the predetermined monitoring time, according to a user's setting.

21. The facsimile apparatus according to claim 11, wherein the control device includes a display function for displaying the current time in the active condition.

22. The facsimile apparatus according to claim 11, wherein after a certain time has elapsed since the condition input device inputs the recovery condition to the operational condition switching device, the condition input device inputs a resume condition to the operational condition switching device, so as to switch the control device to the sleep condition from the active condition.

23. The facsimile apparatus according to claim 22, wherein the condition input device variably controls a time when the recovery condition or the resume condition is input, according to a user's setting.

24. The facsimile apparatus according to claim 23, wherein the operational condition switching device switches the control device to the active condition, due to the external condition input during the sleep condition.

25. The facsimile apparatus according to claim 11, wherein the operational condition switching device switches the control device to the sleep condition from the active condition as idleness in which the recovery condition to be input by the condition input device, or an external condition is not input, continues during a predetermined monitoring time.

26. The facsimile apparatus according to claim 25, wherein the operational condition switching device variably controls the predetermined monitoring time, according to a user's setting.

27. The facsimile apparatus according to claim 11, further comprising:

a switching operation permitting/prohibiting device that permits or prohibits an operation of the operational condition switching device, according to a user's setting.

28. The facsimile apparatus according to claim 11, further comprising:

a predetermined operation permitting/prohibiting device that permits or prohibits an execution of the predetermined operation by the control device, according to a user's setting.

29. The facsimile apparatus according to claim 11, wherein the predetermined operation includes a timer transmission for transmitting data prepared by a user to a recipient at a predetermined time, based on a time counted by the clock device.

* * * * *